April 3, 1951 G. J. EANNARINO 2,546,987
NOISE SUPPRESSION CIRCUIT
Filed Dec. 6, 1946
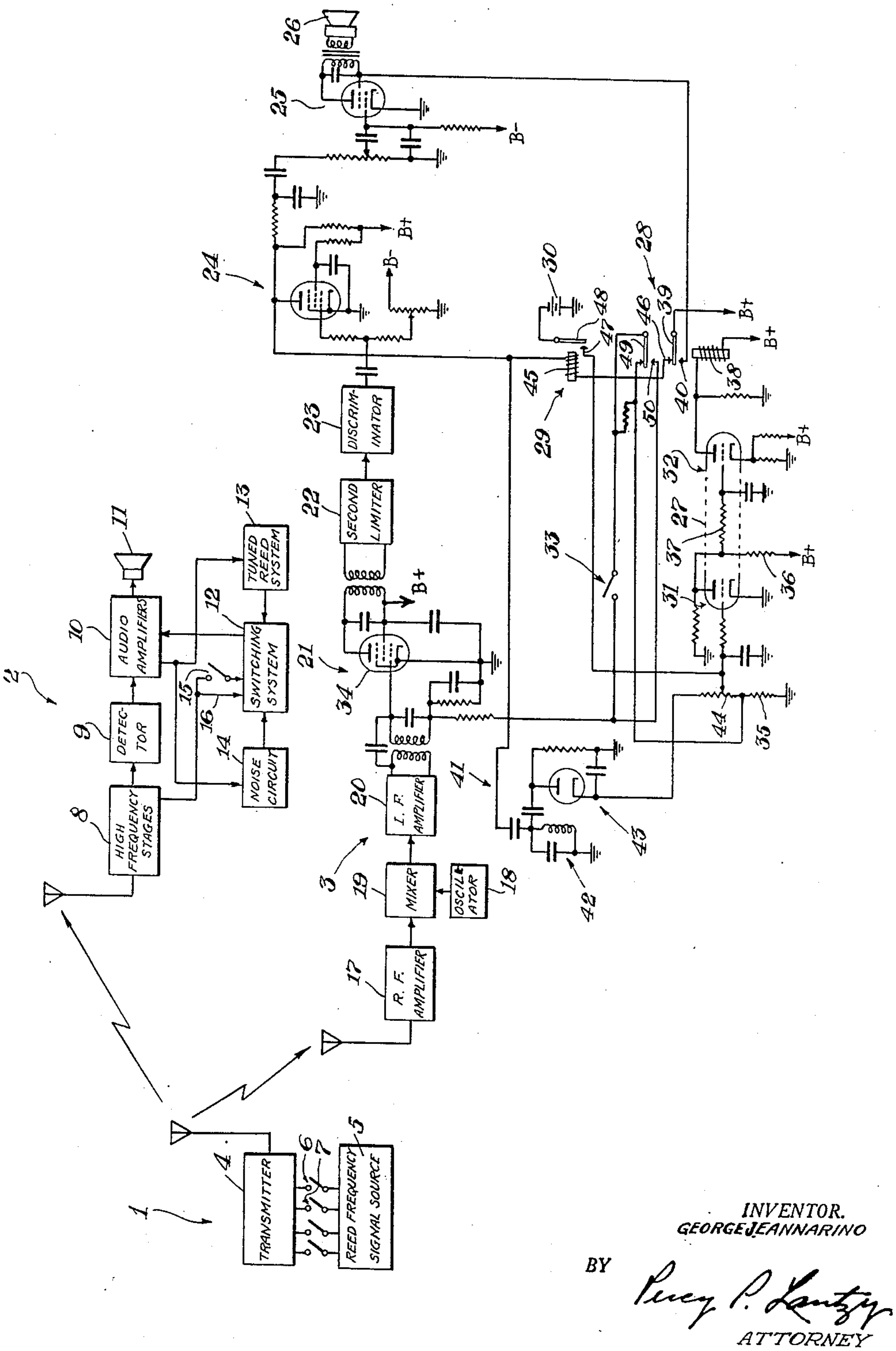
INVENTOR.
GEORGE J. EANNARINO
BY Percy P. Lantzy
ATTORNEY Patented Apr. 3, 1951

2,546,987

UNITED STATES PATENT OFFICE 2,546,987

NOISE SUPPRESSION CIRCUIT

George J. Eannarino, Arlington, N. J., assignor to Federal Telephone and Radio Corporation, New York, N. Y., a corporation of Delaware Application December 6, 1946, Serial No. 714,449

5 Claims. (Cl. 250—6)

The present invention relates to improved radio control systems and, more particularly, to remote control systems wherein radio receivers, which are controlled in operation by transmitted radio signals, are protected from improper operation.

Communication systems in which transmissions from a main station must be directed to selected receivers of a plurality of associated receivers are well known and are widely employed, for example, in police systems wherein communications must be maintained between a central location and a plurality of mobile units.

It may be found in communication systems of this type that interfering carriers may cause undesired receiver operation and that certain receiver noise signals may also render the receiver operative by simulating the reception of the characteristic audio tones. These phenomena are obviously undesirable when it is preferred that the receivers respond only to a certain carrier or to tones intentionally transmitted thereto.

It is therefore one of the major objects of the present invention to provide a radio control system wherein the above difficulties are avoided, and another main object is to provide, for use in such systems, radio receivers wherein noise signals are utilized to prevent improper receiver operation.

With these and other objects in view, the present invention will be explained in the following detailed description which is to be read in conjunction with the block and schematic diagrams shown in the accompanying drawing.

The radio control system as an integrated unit comprises at least one transmitting system and preferably a plurality of receivers, 2 and 3 being representative. Transmitting system 1 is adapted to radiate at least one carrier, and this carrier may be either amplitude or frequency modulated, depending upon preference and system requirements, by the desired intelligence signals. Additionally, the transmitter 4 may be modulated by any one or a combination of a plurality of audio signals from the source of reed-frequency signals 5, these signals being selectively coupled to the transmitter, for purposes which will later become obvious, by means of switches such as 6 and 7.

A typical receiver arrangement suitable for use in the system of this invention is disclosed in block form in the line-up designated generally by numeral 2. The high frequency stages 8 deliver their output to a detector 9 which is in turn coupled to audio amplifiers 10, and the audio reproduction is accomplished by speaker 11 which concludes the conventional receiver lineup. Muting control of the receiver output is achieved by switching system 12 shown coupled to the audio amplifiers 10. Excitation for the switching system 12 may be derived from the high frequency stages 8 and also from a tuned reed system 13. This reed system receives its actuating signals from the audio amplifiers 10. In addition, the noise circuit 14 actuated by output from amplifiers 10 delivers its output signals to switching system 12.

Fundamental operation of the improved control system may be outlined as follows with respect to the preceding disclosure. Transmitting system 1 radiates intelligence signals modulated upon a certain carrier, which carrier may in turn be picked up by receiver 2, amplified in stages 8 and detected by 9, the audio components being amplified and reproduced by amplifiers 10 and speaker 11. Switching system 12 is adaptable to prevent transmission of signals to the speaker from amplifiers 10 except when said switching systems is actuated by certain voltages from stages 8 and reed system 13. Noise circuit 14 provides a bias for switching system 12 which is of one polarity which insures that system 12 will mute the receiver output as long as noise signals appear in audio amplifier 10 and as long as the biasing voltages of a second polarity delivered to system 12 by stages 8 and reed system 13 do not equal or exceed the voltage output of noise circuit 14. If it is desired that the receiver be made operable to deliver an audible output simply upon reception of a desired carrier, switch 15 should be closed, thus coupling stages 8 with the switching system 12 and supplying the system with actuating voltages when the desired carrier is received. During the intervals when a carrier is being received, negligible noise is delivered to noise circuit 14 from amplifiers 10, and the bias on switching system 12 due to the output from circuit 14 substantially ceases to exist, thereby permitting the actuating voltages from stages 8 to actuate system 12 through switch 15 and to render the receiver operative. These actuating voltages, which are delivered by stages 8 only when the desired carrier is received, also appear in coupling line 16 between stages 8 and system 12, although the switching system 12 is adapted to be actuated by these voltages only when such voltages have first been received either from stages 8 through switch 15, or, as later described, from reed system 13. It should therefore be apparent that when the receiver is carrier controlled, as above described, output signals may be delivered only when the actuating voltages from stages 8, which are related to signal strength of the desired carrier, exceed the voltage output of noise circuit 14, which is proportional to the noise appearing in amplifiers 10. When interfering carriers of low signal strength are received the output of noise circuit 14 is usually of sufficient magnitude to prevent actuating of switching system 12 by the low amplitude actuating voltage delivered to the system from stages 8.

If, however, it is preferred to render the receiver operable only when a certain tone modulates the transmitter carrier, switch 15 is left open. Transmitter 4 may be modulated by said certain tone from the source of reed-frequency signals 5 when one or a combination of switches such as 6 and 7 are closed. At receiver 2, said certain tone will be delivered to tuned reed system 13 by amplifiers 10, and system 13 will thereupon transmit an actuating bias of said second polarity to the input of switching system 12. This actuating voltage will cause switching system 12 to operate the receiver providing that no appreciable bias of the opposite polarity is established on the switching system by the noise circuit 14, a condition which exists when a carrier modulated by said certain tone is being received. If certain noise signals or transient conditions in the receiver cause the tuned reed system 13 to be actuated when said certain tone is not received, the switching system 12 will not render the receiver operative, since the bias produced by noise circuit 14 in the absence of a received carrier is adjusted to exceed the opposite polarity actuating bias output of tuned reed system 13. However, once the carrier modulated by said certain tone is received and said actuating voltage is delivered to the then substantially unbiased switching system 12, the biasing voltage of said second polarity from stages 8 delivered by coupling lines 16 will maintain actuation of the system 12 while the desired carrier is received, even though said tone is no longer modulated on the carrier. Cessation of the carrier operates to stop actuation of switching system 12 by biasing voltage of said second polarity and the receiver thereupon becomes inoperative until the tone is again received. Noise circuit 14, responsive to signals occurring when the carrier is no longer received, biases the switching system 12 with a voltage of said one polarity to insure that the receiver is maintained inoperative.

The diagram of the receiver designated by numeral 3 illustrates in greater detail an embodiment of the present invention. This receiver, which may be identical with the receiver 2, is designed for reception of frequency modulated signals, and, included in the receiver lineup are R. F. amplifier 17, local oscillator 18, mixer 19, I. F. amplifier 20, first limiter stage 21, the second limiter 22, discriminator 23, audio amplifier stage 24, power amplifier stage 25, and a speaker 26. That portion of receiver 3 which corresponds to the switching system 12 of receiver 2 includes primarily the double triode 27 and the multiple contact relay 28; and the tuned reed system 13 of receiver 2 has as its counterpart in receiver 3 the tuned reed switching arrangement 29 utilized in conjunction with the biasing battery 30.

The receiving set 3 can, as previously described with respect to receiver 2, be used either for carrier controlled operation or for selective calling operation wherein a selective signal emitted by the transmitter controls the reproduction of intelligence signals by the receiver.

Referring now to the carrier controlled operation of receiver 3, one portion of the control circuit includes a D.-C. amplifier, as a triode 31, and a relay control tube, as a triode 32, with the associated relay 28. Both triodes 31 and 32 are preferably in a single envelope. When the circuit is to be adapted for carrier controlled operation, switch 33 is closed, thereby coupling the negative grid voltage of the first limiter tube 34 to ground through resistance 35 and normally closed contacts of the relay 28. The negative voltage established across resistance 35 is coupled to the grid of the amplifier tube 31 and prevents flow of plate current therethrough. When tube 31 is non-conducting, there is only a small voltage drop across the load resistance 36 and the voltage appearing at the junction of plate resistance 36 and grid resistance 37 is of a sufficiently positive value to permit triode 32 to conduct. The winding 38 of multiple contact relay 28 is thereby energized and plate voltage is applied to the power amplifier stage 25 through armature 39 and contact 40 of relay 28 to render the receiver operative and capable of reproducing audio signals.

The foregoing operation relates to a condition in which desired carrier signals are received. However, when no carrier is picked up the receiver 3, the triode 31 must be biased positively to prevent energizing of winding 38 of the multiple contact relay 28 and subsequent energizing of the audio power output stage 25 and operation of the receiver. Noise circuit 41 accomplishes this by producing a positive D.-C. bias responsive to the noise signals which always occur in the audio amplifier stage 24 when no carrier is received. This noise circuit includes a tuned circuit 42 in parallel with the series combination of the rectifier-filter circuit 43 and resistances 44 and 35, the circuit 42 preferably being tuned to noise frequencies above the audio range, about 12 or 15 kilocycles, which are impressed thereacross from the plate circuit of audio amplifier stage 24. The noise signals from across circuit 42, when rectified and filtered by a circuit 43, produce a voltage drop across resistance 35 and 44 which is opposite in polarity to the voltage drop across resistance 35 resulting from the negative voltage applied thereto from the grid circuit of first limiter tube 34. The voltage applied to the grid 31 is tapped from across resistance 44 and, when the receiver is carrier controlled, there will be a net D.-C. voltage produced by combination of the negative voltage across 35 due to the grid voltage of limiter tube 34 and the positive voltage across resistances 35 and a portion of resistance 44 due to the rectified and filtered noise voltage impressed across series combination resistance 35 and 44. Tube 31 is conducting, and hence relay 28 is unoperated when the grid voltage of this tube is at approximately zero or positive bias value. The tap across resistance 44 is therefore adjusted such that the rectified and filtered noise signals will produce a positive bias which at least equals or exceeds the negative bias produced across resistance 35 when a carrier is not received. Upon reception of the carrier by receiver 3 the positive bias on tube 31 due to noise signals will be negligible in comparison with the negative voltage produced across resistance 35, tube 31 will be rendered non-conducting, relay winding 38 will be energized, armature 39 will close with contact 40, plate voltage will be applied to the audio amplifier stage 35 and the receiver will be rendered operative.

When the circuit of receiver 3 is to be adapted for selective calling operation, the switch 33 is left open. Hence, when no carrier is received, the only voltage applied to the grid of tube 31 is the positive voltage tapped from across resistance 44 and resulting from the rectification and filtering of noise signals by noise circuit 41. The audio power amplifier stage 25 therefore remains de-energized and the receiver is inoperative. When a carrier is received the grid voltage of the first limiter tube 34 will increase in a negative direction; however, since switch 33 is open, there is no bias established for the grid of triode 31 by the voltage in the grid circuit of tube 34 and the relay 28 will not operate.

If then an audio tone of the frequency to which the vibrating reed unit 29 will respond is impressed on the carrier, this audio tone will be applied from the plate circuit of audio amplifier tube 24 to the reed winding 45 through contact 46 and armature 39 of relay 28. Contact 47 and armature 48 will close when winding 45 is thus energized, and negative voltage from source 30 will be applied to the grid of D.-C. amplifier triode 31. Since a carrier is being received at this time, no positive bias will be produced on the grid of tube 31 by noise circuit 41 and the voltage from source 30 will render tube 31 non-conducting, tube 32 conducting, relay winding 38 energized, armature 39 and contact 40 of relay 28 closed, amplifier stage 25 energized, and the receiver operative. Once the relay winding 38 has been thus actuated, armature 49 and contacts 50 of relay 28 will close, and the negative voltage from the grid circuit of limiter tube 34 will be applied to the grid of triode 31, thereby maintaining the receiver in an operative condition. Cessation of the carrier thereafter will reduce the negative voltage delivered to triode 31 from the grid of limiter tube 34 and will result in a positive voltage being applied to triode 31 from the noise circuit 41 due to noise signals occurring in audio amplifier stage 24 in the absence of a received carrier. The net positive voltage which is therefore applied to the grid of triode 31 renders this tube conducting, triode 32 nonconducting, winding 38 unenergized, audio amplifier stage 25 unenergized, and the receiver inoperative.

The receiver 3 is thus protected against improper operation due to closing of armature 48 and contact 47 of tuned reed system 29 when no carrier is received. Such reed actuation may, for example, occur as a result of certain noise signals which are present in the absence of a received carrier. This protection is achieved by utilizing a voltage source 30 whose negative voltage output to the grid of triode 31 does not exceed the positive bias normally delivered to the triode 31 from across resistance 44 and from the noise circuit 41 when no carrier is being received. Consequently, undesired closing of the tuned reed contacts will not cause operation of the receiver.

The sensitivity of this receiver system may be adjusted by varying the position of the tap on resistor 44. If the tap is moved in a direction which increases the resistances between the grid of tube 31 and ground, the positive bias on the triode 31 due to noise signals will be increased. Therefore, a greater negative voltage in the grid circuit of the first limiter tube 34 is required to cause operation of the relay 28 when the system is set for carrier controlled operation. The grid voltage of the first limiter tube 34 is a function of signal strength and up to a certain point increases with the signal strength. If, for example, it is desired that the receiver shall not be rendered operative upon reception of low signal strength interfering carriers, the tap on resistance 44 should be moved to increase the positive grid bias on tube 31 due to noise signals from noise circuit 41. Hence, when a low signal strength interfering carrier is received the output of the noise circuit may be of sufficient magnitude to prevent actuating of relay 28 and subsequent operation of the receiver.

By utilizing the receiver noise signals to produce a bias on the receiver muting arrangement, as herein described, it is possible, then, to prevent undesired operation of the receiver by said interfering carrier signals, to insure a positive operation of the receiver when carrier controlled, and to prevent improper receiver operation resulting from actuation of the tuned reed system by erroneous signals.

While the principles of this invention have been disclosed in detail with respect to a mobile frequency modulation receiver, it should be clear that the same principles can be used in connection with an amplitude modulation receiver by appropriate adaptations well known to those skilled in the art. The system as a whole has been digrammed with only a single transmitter and two receivers, although, of course, any number of transmitters and receivers may be incorporated therein. Also, each receiver may be adapted to respond to a tone which is characteristic to its own reed alone, or several receivers may be adapted to respond to the same tone. Any required number of tones may be derived from the source of reed signal frequencies 5 and these may be impressed simultaneously or individually upon the transmitter 4 to achieve appropriate modulation of the carrier, depending upon whether it is desired to cause one or a plurality of receivers to respond to the transmitter signals. It may also be desirable to maintain operation of any receiver only as long as a certain characteristic audio tone is received, in which case this tone may be blocked from reaching the speaker and then, with certain obvious changes, the general arrangement diagrammed herein may function suitably.

There are many changes which may be instituted in the above circuits without departing either in principle or scope from the invention herein disclosed. For example, the rectifier filter arrangement 43, which includes a vacuum tube in the accompanying drawing, may be satisfactorily replaced by a rectifier-filter which includes a dry rectifier unit. Voltage source 30 associated with the tuned reed system 29 need not be a battery as shown and instead the required voltage may be tapped from any suitable point in the receiver circuit. Although it is preferred to tap the desired negative voltage, which occurs responsive to the reception of the carrier, from the grid circuit of the first limiter tube 34, it may be possible to obtain a suitable voltage from other points in the receiver. Also, additional contacts and armatures may be included in the multiple contact relay 28 to provide additional controls when this relay is actuated. One such additional control being, for example, switching in the filament circuit in the audio power amplifier stage to permit a reduction in average filament current drain. It may also be preferred to interrupt portions of the audio power amplifier stage other than the plate circuit to accomplish muting of the receiver output, in which case the obvious changes should be made.

While the principles of this invention have been disclosed in connection with preferred embodiments, it should be apparent from the foregoing discussion that these embodiments have been presented by way of example and preference only and should not be construed as limiting the scope of the invention.

I claim:

1. A radio communication system, comprising: a transmitter, means for selectively modulating the transmitter carrier with any of a plurality of characteristic audio frequency tones, at least one receiver system adapted to receive a carrier radiated by said transmitter, including high frequency stages, detector means, audio amplifier and audio reproducing means, a muting device for controlling the audio output of said receiver system, a noise circuit for applying to said muting device a biasing voltage which is proportional in amplitude to certain noise signals in said receiver system and which is of one polarity suitable for actuating said muting device to mute the audio output of said receiver system, a tuned reed system, responsive to the occurrence of a certain characteristic audio frequency tone in said receiver system, for applying to said muting device a biasing voltage which is of a second polarity suitable for actuating said muting device to control said receiver system such that an audio output may be delivered thereby, and means for coupling a biasing voltage of said second polarity to said muting device, from a point in said high frequency stages where said biasing voltage exists responsive to the reception of a carrier, following actuation of said muting device by said tuned reed system.

2. A radio receiving system, comprising: means for receiving radio frequency carriers and for reproducing audio components thereof including high frequency stages, detector means, audio amplifiers and audio reproducing means, a multiple contact relay, an operating coil for said relay, a pair of normally open contacts connected between said audio amplifiers in the source of energizing voltage for said amplifiers, a control device for energizing said relay operating coil responsive to certain biasing voltages, a noise circuit responsive to noise signals appearing in said audio amplifiers for producing a bias of polarity tending to prevent said control device from energizing said operating coil a tuned reed system responsive to a characteristic audio frequency signal demodulated by said receiving means for applying to said control device a biasing voltage of a second polarity tending to cause said device to energize said operating coil, and a second pair of normally open relay contacts connected between said control device and a point in said high frequency stages where biasing voltage of said second polarity appears when a carrier is received.

3. A radio receiving system according to claim 2 wherein said noise circuit comprises a resonant circuit coupled to a point in said audio amplifiers where noise signals may appear and tuned to frequencies above the audible range, and a rectifier-filter combination connected to derive a D.-C. biasing voltage for said control device from across said resonant circuit.

4. A radio receiving system according to claim 2 wherein said control device comprises a first vacuum tube which conducts only when the net grid bias thereon, derived from said tuned reed system and said noise circuit and said high frequency stages, exceeds a definite value, and a second vacuum tube connected in series with said operating coil and a power source and actuated by said first vacuum tube such that said second vacuum tube is rendered conducting when said first vacuum tube is non-conducting and said second vacuum tube is non-conducting when said first vacuum tube conducts.

5. A radio receiving system comprising a frequency modulation receiving arrangement including high frequency stages, demodulating means, audio amplifier stages, and audio reproducing means, a multiple contact relay switching means, said relay switching means including an operating coil, a pair of normally open contacts of said switching means connected between said audio amplifiers and energizing means for said audio amplifiers, a vacuum tube to energize said operating coil, a tuned reed system responsive to a certain characteristic audio frequency tone in said audio amplifiers for applying to said vacuum tube a biasing voltage of one polarity such that said operating coil is energized, a noise circuit responsive to certain noise signals which may appear in said audio amplifiers for applying to said vacuum tube a biasing voltage of a second polarity such that said operating coil is rendered unenergized, and a second pair of normally open relay switching means contacts connected between said vacuum tube and a point in said high frequency stages where a biasing voltage of said one polarity exists when a carrier is received.

GEORGE J. EANNARINO.

REFERENCES CITED

The following references are of record in the file of this patent:

UNITED STATES PATENTS

| Number | Name | Date |
|---|---|---|
| 1,608,969 | Webbe | Nov. 30, 1926 |
| 2,065,826 | Roosenstein et al. | Dec. 29, 1936 |
| 2,165,800 | Koch | July 11, 1939 |
| 2,237,457 | Tellegen | Apr. 8, 1941 |
| 2,247,085 | Goldman | June 24, 1941 |
| 2,261,643 | Brown | Nov. 4, 1941 |
| 2,263,633 | Koch | Nov. 25, 1941 |
| 2,279,095 | Sohnemann | Apr. 7, 1942 |
| 2,292,222 | Haigis | Aug. 4, 1942 |
| 2,321,651 | Caraway | June 15, 1943 |
| 2,341,325 | Kenefake | Feb. 8, 1944 |
| 2,343,115 | Noble | Feb. 29, 1944 |
| 2,361,585 | Appel | Oct. 31, 1944 |
| 2,362 958 | Sandretto | Nov. 14, 1944 |
| 2,370,216 | Worcester | Feb. 27, 1945 |
| 2,381,754 | Jadraque et al. | Aug. 7, 1945 |
| 2,392,672 | Koch | Jan. 8, 1946 |
| 2,479,305 | Brown | Aug. 16, 1949 |
| 2,480,115 | Brown et al. | Aug. 30, 1949 |